June 5, 1934.    W. F. FABER    1,961,288
REFORMING OF LIGHT PARAFFIN HYDROCARBONS
Filed Sept. 1, 1928    2 Sheets-Sheet 2
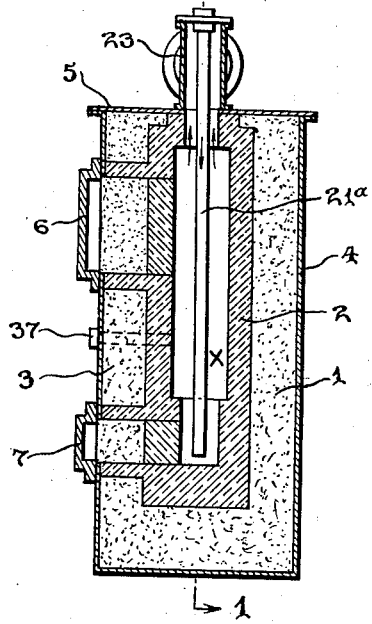
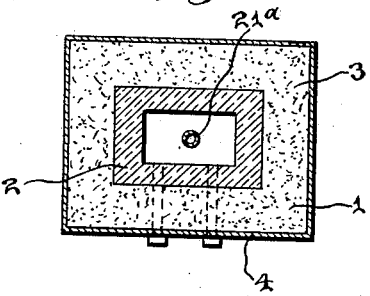
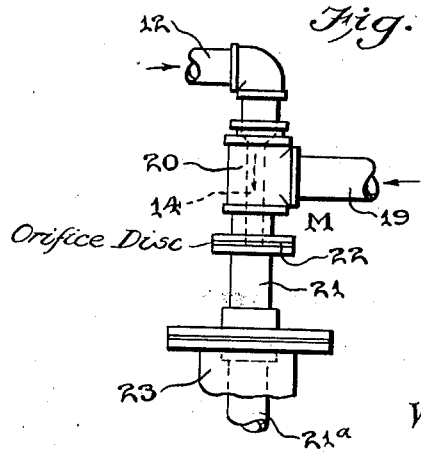
Inventor
William F. Faber,
By George A. Prevost
Attorney Patented June 5, 1934

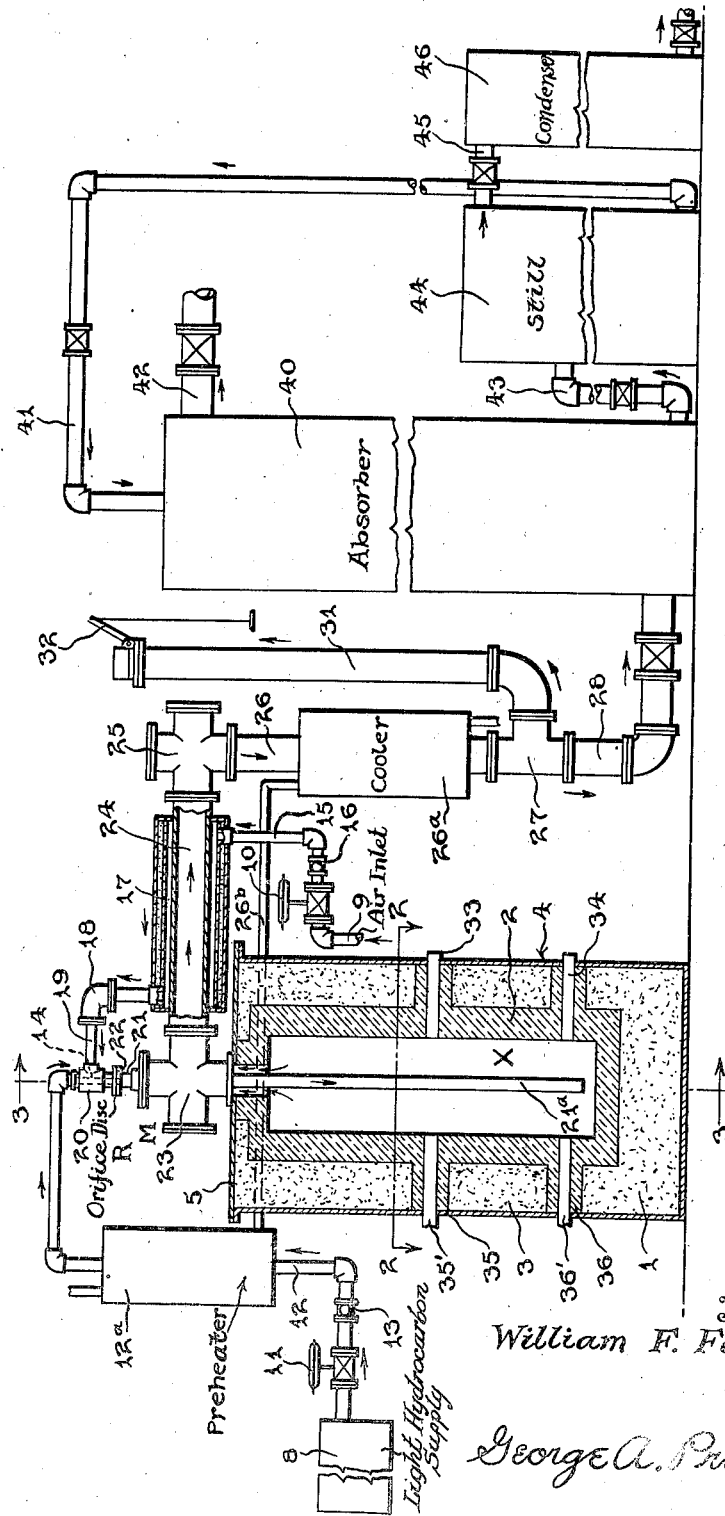

1,961,288

UNITED STATES PATENT OFFICE 1,961,288

REFORMING OF LIGHT PARAFFIN HYDROCARBONS

William F. Faber, Newark, N. J., assignor to Victor N. Roadstrum, West Orange, N. J.

Application September 1, 1928, Serial No. 303,555

6 Claims. (Cl. 196—65)

This invention relates to the reforming of substantially pure light paraffin hydrocarbons or mixtures thereof, such as natural gasoline, butane, propane or natural gas, principally with the object in view of forming heavier from lighter hydrocarbons for use in, or as a motor fuel.

Natural gases are obtainable from the earth in many localities. They frequently have quite different characteristics, particularly as to certain constituents thereof or entrained therein and also in regard to the ratio of the varied constituents thereof or therein.

In some places the available natural gases are used as a fuel with little or no special processing or treatment. In other places, the natural gases are processed in order to remove therefrom, or in order to take or obtain therefrom certain ingredients, as for the purpose of obtaining such products as gasoline. In other localities, the petroleum industry has natural gases, as a by-product to the liquid petroleum being sought.

In still other localities, the gasoline industry, as from the crude gasoline or wild gasoline,—and also by way of example, the oil industry,—has available as a by-product, gases such as methane, ethane, propane, etc., which, for the purposes of the invention, are natural gases. As above indicated, there are derived from the crude gasoline or wild gasoline, after the latter has been separated and obtained from the original natural gases, such natural gases as propane and, or butane, as well as others.

The expression "natural gases", as well as the expression "combustible natural gases" used herein, is intended to indicate any of the gases above indicated as natural gases; in fact, any and all gases generally known as natural gases. All such natural gases have a relatively high calorific value; for example, it is quite common to find these natural gases with a calorific value of 1200 British thermal heat units or even higher per cubic foot of gas; that is, gas at 60 degrees F. temperature and 30 inches mercury pressure.

For certain uses, it is not advisable or necessary to have this high calorific value. Moreover, in most of these natural gases all of the hydrocarbons therein are not entirely in the form of permanent gases for therein there are certain percentages of the hydrocarbons in mist or vaporous form, some of which can be condensed or liquefied by cooling alone or by cooling and pressure; or, they may be removed in other ways as, for example, by suitable absorption systems.

As above indicated, according to certain aspects of the invention, there is to be effected a reformation—many might call it cracking—of the natural gases by subjecting them, with the entrained vapors therein if there are any or even after vapors have been removed therefrom, to a partial combustion and to the direct action of the heat of the partial combustion of the gases undergoing treatment in a manner to convert the natural gases into two products, each in maximum quantity, a fixed combustible gas of larger total volume and lower thermal or calorific value per unit of volume than the original natural gases, and a liquid suitable for use as a motor fuel.

According to another aspect of the invention, there is to be effected a conversion of natural gasoline, butane or propane, by subjecting the same to a parital combustion, and to the direct action of the heat of the partial combustion of the material undergoing treatment in a manner to reform the hydrocarbons or some of them into a heavier liquid product suitable for use as a motor fuel.

One of the objects of the invention is to produce a reformed combustible fixed gas of predetermined calorific value and chemical constituency, and a maximum percentage of liquid products, by the method and apparatus which involves the continuous, intimate and uniform mixing of paraffin hydrocarbon combustibles, to wit, the natural gases principally composed of gaseous hydrocarbons, as methane, ethane, propane and/or butane—either alone, either two or more mixed or combined with various hydrocarbons and in various percentages or proportions relative to each other—or natural gasoline—with a combustion supporting gas, to wit, an oxygen supplying ingredients as air, and effecting an incomplete combustion while maintaining an established ratio of said combustible and combustion supporting gas, thus converting the combustible by a parital combustion of the same, and combustion supporting gas, and by the direct influence of the heat created by the partial combustion, into a fixed combustible gas of low thermal or calorific value per unit of measure—per unit of volume and liquid products suitable for motor fuel—or into liquid products mainly, and this process is one capable of being carried out without the production of free carbon or lamp black.

According to one aspect, the invention is carried out in an apparatus having a reforming zone with a hot zone therein, and within which apparatus the combustion supporting gas, as, for example, air heated by the sensible heat of the hot gaseous mixture leaving the reforming zone, by means of a suitable heat interchanger, and within which apparatus the mixture of combustible and heated combustion supporting gas is thereafter further heated prior to its delivery into the hot zone of the reforming zone, and within which said hot zone, partial combustion and cracking into fixed gas of low thermal value per unit of measure, and cracked liquid hydrocarbons, or liquid products alone takes place, depending on the starting material and conditions of treatment.

Further aspects of the invention are directed to the apparatus and equipment for carrying out or realizing the objects or aspects referred to above.

For the purpose of this invention, the expression "natural gases" and the expression "combustible natural gases" is to be construed the equivalent of each other, and each is to be broadly construed as covering anything which may be nothing more than a single natural combustible gas, as butane, or any gaseous substance or composition which includes, in the main any one, two, or more natural combustible gases.

As illustrative of the manner in which the invention may be realized reference is made to the drawings forming a part of this specification and in which drawings, Fig. 1 is an elevation partly in section showing the general arrangement of the hydrocarbon reformer and separation equipment. The reformer as shown is an apparatus having a reforming chamber which when the apparatus is in normal operation, provides a hot reforming zone wherein natural gases or natural gasoline are reformed by a process that includes the continuously mixing of air which preferably has been preheated and the natural gases or natural gasoline, the further heating of the mixture while conducting it toward and into the hot reforming zone and therein permitting or allowing partial combustion and cracking to take place, and continuously withdrawing the resulting gases and liquids from the apparatus. The apparatus is provided with suitable off-take piping for the withdrawing from the hot reforming zone of the resulting gases and vapors, and the apparatus is preferably provided with heat interchanging means associated with the off-take piping whereby there can be a transfer of heat to the incoming air from the mixture of hot gases and vapors, as the latter is passing outwardly through the off-take piping. The structure providing the reforming chamber wherein the reforming zone is located is shown in vertical section in this Figure 1, and is a view taken as on the line 1—1 of Figure 2, or on line 1—1 of Figure 3, looking in the direction of the arrows.

Figure 2 is a horizontal section of the structure providing the reforming chamber, and is a view taken as on the line 2—2 of Fig. 1, looking in the direction of the arrows.

Figure 3 is a vertical section of the structure providing the reforming chamber, and is a view taken as on the line 3—3 of Fig. 1, looking in the direction of the arrows.

Figure 4 is a view showing in detail the piping construction by which the preheated air and combustible are mixed. This view also shows the upper portion of the pipe or conduit by which the mixture is conducted toward and into the reforming zone of the reformer, and within which pipe or conduit the mixture is further heated or superheated while in transit.

The reforming apparatus, as the system as a whole may be referred to, is herein designated by R. It includes the hydrocarbon reforming chamber 1, which is provided with a refractory lining, as 2, that is surrounded with heat insulating material, as 3. The reforming chamber is provided with a gas tight metallic casing or shell 4, having a suitable removable cover 5, held in place in any suitable manner. This casing or shell 4 is provided with suitable doors, as 6 and 7, normally closed, but which can be removed or opened in order to permit access to the interior of the reforming chamber 1. The interior space defined by the refractory lining 2, may be referred to as a reforming zone X. the zone X as a whole, is frequently referred to as the hot reforming zone, since it is maintained hot during and by the normal functioning of the reforming process. It will be noted, as will later more fully appear, that the heat for maintaining the process, is derived from the partial combustion that takes place, within the reforming zone X. The general lower portion of this reforming zone X provides the hottest section of this zone, and may be referred to as the hot section of the reforming zone X. The exact location of this hot section in the reforming zone, is dependent largely upon the mode of operation and rate of capacity; in other words, the general location of this hot section rises as the capacity of the particular apparatus is increased.

The natural gases or natural gasoline to be reformed, may come from any suitable source of supply, as, for example, from a tank designated by 8. The combustion supporting gas for supplying the oxygen used in the process, for example, air, may also come to the apparatus from any suitable source of supply, as through pipe 9. The air and the combustible each preferably pass from its respective source of supply, through a suitable pressure regulating means, as 10, for the air, and 11 for the combustible. This pressure regulating means in conjunction with certain members of the mixing means M, which members are hereinafter described in detail, can be relied upon to ensure a delivery of the proper proportions of combustible and air into the reforming zone; in other words, the construction of the pressure regulating means 10 and 11, and the mixing means M, is such that the proper proportions of the combustible relative to the air can always be maintained. The natural gases or natural gasoline from the tank 8 flow through the pressure regulating means 11, piping 12 having a valve 13 therein, to a constricted delivery nozzle or tip 14, providing a defined area or opening through and from which the natural gases or natural gasoline are delivered into the hot or preheated incoming air. The air for the process flows through the pressure regulating means 10, piping 15 having a valve 16, to and through a heat interchanger 17, and from the said heat interchanger 17, the heated air, frequently called the preheated air, passes through piping 18 and 19, into and through the piping T 20, which surrounds the delivery nozzle or tip 14 heretofore referred to.

The hot air from T 20 passes into pipe 21, past the delivery nozzle or tip 14, and at or near the delivery end of the said tip, this air and combustible commence to diffuse and mix, and the mixed air and combustible flow downwardly for a substantial distance along pipe or conduit 21 and 21a, from which the mixture is delivered into the bottom of the reforming zone X.

In order that air may be delivered with velocity and sufficient accuracy as to volume to the incoming combustible, there is provided an orifice disk or plate 22, arranged in cooperative relation with respect to the delivery end of the nozzle or tip 14, so as to provide a defined area for the passage of the air. The air is preferably delivered at a higher velocity than the combustible, in order to promote an intimate and rapid mixing of the air and combustible.

This mixture of combustible and air which is delivered to the reforming zone X undergoes therein partial combustion and cracking, thus producing therein the ultimate desired gas and/or liquid. The temperature within this reforming zone, and the proportions of combustible and air with respect to each, is regulated according to the characteristics of the combustible undergoing treatment, and according to the characteristics desired for the final products. The resulting mixture of gas and vapor passes upward from the reforming zone X, into the off-take cross 23, through off-take piping which includes piping members 24, 25, 26, 27 and 28. During the "warming up" period, the products pass from pipe 27, into relief piping 31, having thereupon a relief valve 32, the piping 24 constituting part of the heat interchanger 17. It will be noted that the heat from the off-going gaseous mixture passing through piping 24 is readily transmitted by any suitable construction to the inflowing air passing from the piping 15 through heat interchanger 17, and piping 18, on its way to the interior of the reforming zone X. Suitable pyrometer openings—which are normally sealed and gas tight—, are provided as at 33 and 34.

It will be here remarked that the temperatures within the reforming zone are maintained within ranges approximating 900 degrees F. to 1800 degrees F. dependent, as previously indicated, upon the character of the combustible used, the character of the products desired, and the rate of product made. The pressure in said zone will usually be only slightly above atmospheric. Inspection openings or "sight cocks" are provided, as at 35 and 36. These openings have suitable glass closures, as at 35' and 36', or other transparent medium whereby heat conditions within the reforming zone may be inspected by the eye.

In order to separate the gaseous product from the liquid product, the mixture leaving by way of valved pipe 28 may be cooled in any suitable cooler 26a and then be fed into an absorption tower 40, where it is subjected to a shower of absorbent oil introduced by way of valved pipe 41. The absorbent oil, as is usual in such systems, absorbs the vapors and thus denudes the gas; the latter discharging through a conduit 42, which may lead the same to any desired point of storage or consumption.

The vapor enriched absorbent oil leaves the absorber through pipe 43 which leads this liquid mixture to any suitable form of stripping still 44, wherein the absorbed vapors are separated from the oil by distillation. The vapors, thus extracted, are conducted through a line 45 to a condenser 46, wherein they are liquified and become the liquid product of the process.

Absorbent oil from the still passes by way of the pipe 41, back to the absorber for reuse.

The water used as a cooling agent in the cooler 26a may be led by a pipe 26b to a preheater 12a and used therein to preheat the combustible flowing toward the converter R.

It will, of course, be understood that suitable heat exchangers for the vapor enriched absorbent oil, and the denuded absorbent oil, may be used, in order to utilize the heat of the oil leaving the still to preheat the vapor enriched oil about to enter the still, and to cool the denuded absorbent oil on its way to the absorber.

To start up the apparatus, the natural gases or natural gasoline and the air are fed through the respective conduits to the mixing device M in such proportions as to produce nearly complete combustion when the mixture is ignited, as by torch flame inserted through a sight hole as 36. During this heating up period, secondary air is admitted at connections, such as 37 Fig. 3, to furnish sufficient air for complete combustion of all the combustibles. In this way the reforming apparatus is quickly brought to the required reforming temperautre. The combustion products resulting from the heating up process are conducted from the hot reforming zone X—from the interior of the structure defining said zone—through the gas off-take piping 24, 26, 29, 31 and are allowed to escape through the relief valve 32. In short, the pipe 31 and the valve 32 may be referred to respectively as stack and stack valve. When the temperature of the reformer has attained the desired heat and is ready for the reforming process, viz., when the temperature within the reforming zone and the structure defining the same is, for example 1100 degrees F., and which temperature of 1100 degrees F. for certain combustibles and conditions, is a normal temperature, then the proportion of combustibles and air is changed to the proper ratio, the secondary air is cut off, the stack valve 32 is closed, and the reforming of the combustible natural gases or natural gasoline commences. When normally operating, the resulting gaseous mixture leaves the reforming chamber passing successively through pipe 24, which is within or a part of the heat interchanger 17, piping members 25, 26, 27 and 28, to the absorption system, in which the gaseous product is separated from the liquid product. Assuming the reformer started up and in normal operation, there will now be described somewhat in extended detail, the process as actually carried out therein.

The combustible, to wit, the natural gases or natural gasoline, and the combustion supporting gas, to wit, any suitable oxygen providing gas, for example air, are supplied—preferably continuously—from the respective supplies, through the respective conduits or piping to the mixing device M shown in Figures 1 and 4. More specifically, the combustible is continuously supplied from any suitable source, as from tank 8, and flows past the pressure regulating means through piping 12, containing the valve 13, and finally leaves the piping 12 through the constricted nozzle or tip 14 of the mixing device M. This nozzle or tip 14 directs the combustible into the hot combustion supporting gas, to wit, the preheated air. The air is supplied through the piping containing the regulating valve 10. The combustible and the air are supplied so that the ratio or proportions of the one with respect to the other remains constant. The air passes through the heat interchanger 17. In other words, in the construction shown, the air passing through the heat interchanger, passes around the piping 24 which is maintained hot by the heat from the outgoing hot gaseous mixture leaving the reforming chamber, with the result that the incoming or inflowing air is preheated by the heat imparted from the out-going hot gaseous mixture.

The air thus preheated enters the T member 20 and finally leaves through a defined area, to wit, the area of space between and defined by the outside portion of the tip 14, and the orifice defining portion of the orifice disk 22. It will be noted that this defined area for the delivery of the air is near the place where the natural gases or natural gasoline from tip 14 are delivered into the preheated air, and it is at or near the place where an intimate mixing of the air and combustible begins. Preferably, the air and combustible are delivered into the mixer M at different velocities; and this tends to further hasten the intimate mixing. The mixture continues to travel downwardly through pipe or conduit 21 and 21a, and for a substantial distance, the travel within the pipe or conduit 21a is under the heating influence of the reforming zone, and the hot materials therein, or on their way therefrom. During this downward travel within the pipe or conduit 21a, the intimate mixing continues until a relative uniform mixture results, and also on the downward travel, a further substantial amount of heat is externally added to the mixture, and the mixture may be considered as becoming superheated. The rate of downward flow is greater than the rate of flame propagation, and the hot mixture when delivered from the bottom of the pipe or conduit 21a into the already hot reforming zone, undergoes partial combustion that takes place within the reforming zone, and which partial combustion maintains hot the reforming zone and the structure defining the reforming zone. The combustion supporting gas, to wit, air, mixed with the natural gases or natural gasoline, is supplied in such quantities as will support only a partial combustion; in other words, it is supplied in such quantities as to produce when the resulting partial combustion takes place and is effected within the reforming zone, a temperature which is approximately within the range of between 900 degrees F. and 1800 degrees F., the particular temperature being dependent primarily upon the characteristics of the combustible being reformed, the characteristics of the products desired, and the rate of operation.

The temperature of the reformer is maintained by the heat liberated from partial combustion of the combustible, so long as the proper portions of the natural gases or natural gasoline and the air are held constant.

I believe I am the first to reform a substance or substances, such as natural gases or natural gasoline:

(a) by intimately mixing such substance or substances with a combustion supporting gas, specifically air—preferably but not necessarily preheated—, and which combustion supporting gas or air is sufficient in amount to support partial combustion only or in other words, is sufficient in amount to support complete combustion;

(b) by continuously conveying such mixture toward and conducting it to a hot reforming zone—while preferably but not necessarily adding heat to said mixture being thus conducted—;

(c) by directing said mixture into the hot reforming zone and which zone is preferably maintained at a temperature within the range of approximately 900 degrees F. to 1800 degrees F. as the result of the heat given off from and by the partial combustion which takes place within said hot reforming zone, and thus producing the resulting gaseous mixture within said zone, without the production of lamp black or free carbon; and (d) by withdrawing the resulting gaseous mixture from the hot reforming zone; the withdrawing of the hot gaseous mixture being preferably carried out in such manner that heat is transferred from the mixture being withdrawn, to wit, from the off-going gaseous mixture, to the incoming combustion supporting gas—to the incoming air—that is used in or for the mixture;

(e) by separating the liquid products from the gaseous products.

It is to be understood that I claim broadly the invention which enables to be realized the producing of such fixed combustible gases and liquid suitable for motor fuel, within such specified temperature range so that there is produced, when the invention is realized, a gas of low calorific value per unit of measure, and a relatively large amount of liquid hydrocarbons of the nature of benzol.

Such gaseous substances as those which may be employed have a calorific value of 1000 to 3500 British thermal units (B. t. u.) per cubic foot at normal temperature of 60 degrees F. and normal atmospheric pressure of 30 inches of mercury, and therefrom by the process above described, (if natural gases are processed), I am able to produce a reformed gas having a calorific value as desired, of from approximately 250 to 650 B. t. u. per cubic foot at normal temperatures of 60 degrees F. and normal atmospheric pressure of 30 inches of mercury, and a material quantity of liquid hydrocarbons suitable for motor fuel.

If natural gasoline is the combustible employed in the process, it will be converted into a heavier hydrocarbon liquid especially suitable for use as a motor fuel.

The improvements herein set forth are not limited to the precise construction and arrangement shown and described, for it will be appreciated that they may be realized in various forms, ways and modifications without departing from the spirit and scope of the invention.

What I claim and desire to secure by Letters Patent is:

1. The manufacture of a combustible fixed gas and heavier liquid gasoline hydrocarbons from a light paraffin hydrocarbon substance by the method which includes preheating a continuous inflow of combustion supporting gas, continuously and uniformly mixing according to predetermined ratio, said light paraffin hydrocarbon substance with the preheated inflowing combustion supporting gas, but in quantity sufficient to support partial combustion only, further heating said mixture while it is being conducted to a non-catalytic hot gas reforming zone which is maintained at predetermined temperature within a range of approximately 900 degrees F. to 1800 degrees F., dependent upon the nature of the light paraffin hydrocarbon substance, and upon the products desired, delivering said further heated mixture into a non-catalytic hot gas reforming zone and therein permitting a partial combustion, and consequent reforming of the light paraffin hydrocarbon substance, as a result of the partial combustion and heat generated thereby, thus producing a reformed gas and heavier gasoline hydrocarbons, and separating the heavier gasoline hydrocarbons from the reformed gas.

2. The manufacture of a combustible gas and heavier gasoline hydrocarbons from a light paraffin hydrocarbon substance by the method which includes preheating a continuous inflow of air, continuously and uniformly mixing according to predetermined ratio said light paraffin hydrocarbon substance with the preheated inflowing air, but in quantity sufficient to support partial combustion only, further heating said mixture while it is being conducted toward a hot non-catalytic reforming zone that has a portion which is maintained at predetermined maximum temperature within a range of approximately 900 degrees F. to 1800 degrees F., delivering said mixture into the hot non-catalytic reforming zone wherein there results a partial combustion and consequent reforming of the light paraffin hydrocarbon substance in a manner to produce a combustible gas and heavier hydrocarbons, and subsequent separating the heavier gasoline hydrocarbons in liquid form from the combustible gas.

3. In the manufacture of a combustible gas and heavier gasoline hydrocarbons from a light paraffin hydrocarbon substance, by the method which includes mixing said light paraffin hydrocarbon substance with air in such proportions that a combustion which is only partial can follow, heating said mixture while it is flowing toward and into a non-catalytic reforming zone maintained at a temperature within a range of approximately 900 degrees F. to 1800 degrees F., by the heat liberated during the process, causing reforming of the light paraffin hydrocarbon substance by the heat given off as the result of the partial combustion thus produced, and thereby producing a combustible gas of low calorific value and heavier hydrocarbons, and subsequently separating the heavier gasoline hydrocarbons from said combustible gas.

4. In the manufacture of a combustible gas and heavier gasoline hydrocarbons from a light paraffin hydrocarbon substance, by the method which includes preheating a continuous inflow of air, continuously and uniformly mixing said light hydrocarbon substance with the inflowing preheated air in such proportions that partial combustion follows, maintaining a predetermined ratio of said light hydrocarbon substance and air, heating said mixture while flowing it toward and into a hot non-catalytic reforming zone maintained at a temperature of approximately 900 degrees F. to 1800 degrees F., by the heat liberated during the process, reforming the light paraffin hydrocarbon substance by the partial combustion and heat given off as the result of the partial combustion, thereby producing, without the formation of free carbon or lamp black, a combustible gas and heavier hydrocarbons, and subsequently separating the heavier gasoline hydrocarbons from said combustible gas.

5. In the manufacture of heavier gasoline hydrocarbons and a combustible gas from a light paraffin hydrocarbon substance by the method which includes preheating a continuous inflow of air, continuously and uniformly mixing said light paraffin hydrocarbon substance with the inflowing preheated air in such proportions that partial combustion follows when the mixture is delivered into a hot non-catalytic reforming zone that is maintained at a temperature within a range of approximately 900 degrees F. to 1800 degrees F., maintaining a predetermined ratio of said light paraffin hydrocarbon substance and air, further heating said mixture while it is flowing toward and into the hot reforming zone which is maintained at said temperatures by the heat liberated as the result of the partial combustion, directing said preheated mixture into said hot reforming zone, and permitting the partial combustion, reforming of the hydrocarbons by the partial combustion and the heat given off as the result of the partial combustion, thereby producing, without the formation of free carbon or lamp black, a combustible fixed gas and heavier hydrocarbons, and subsequently separating the heavier gasoline hydrocarbons from said fixed gas.

6. The manufacture of heavier gasoline hydrocarbons and a combustible gas from a light paraffin hydrocarbon substance, by the method which includes preheating a continuous inflow of combustion supporting gas, continuously, intimately and uniformly mixing said light hydrocarbon substance with the inflowing preheated combustion supporting gas, while maintaining a predetermined ratio of said light hydrocarbon substance and said combustion supporting gas, further heating said mixture while flowing on its way to a hot non-catalytic reforming zone which is maintained at predetermined temperatures within a range of approximately 900 degrees F. to 1800 F., delivering said further heated mixture into the hot non-catalytic reforming zone within which a partial combustion takes place, and the reforming of the light paraffin hydrocarbon substance follows, thus producing,—without the production of free carbon or lamp black—, a combustible gas of low calorific value and heavier gasoline hydrocarbons, and subsequently separating said hydrocarbons from the combustible gas and recovering the same in liquid form.

WILLIAM F. FABER.